UNITED STATES PATENT OFFICE.

CARL SCHAEFFER, OF ELIZABETH, NEW JERSEY.

IMPROVEMENT IN THE MANUFACTURE OF ARTIFICIAL STONE.

Specification forming part of Letters Patent No. 84,003, dated November 10, 1868.

*To all whom it may concern:*

Be it known that I, CARL SCHAEFFER, of Elizabeth, in the county of Union and State of New Jersey, have invented a new and useful Improvement in the Manufacture of Artificial Stone; and I do hereby declare the following to be a full, clear, and exact description thereof, which will enable those skilled in the art to make and use the same.

This invention consists in exposing stones formed of cement and sand to the action of diluted sulphuric acid in such a manner that said stones are rendered hard, tough, and capable of resisting the action of moisture or the influences of atmospheric changes. In carrying out my intention I take cement (lime) one part, river sand three parts, and mix the same with a solution of two parts of sulphuric acid in one hundred parts of water into plastic mass, which I form into stones of the required form by means of suitable molds, or in any other desirable manner. After the stones have been formed I subject them to the action of heavy pressure, and then I dry them in the open air for about two days. After that the stones are again introduced into a bath of diluted sulphuric acid, (about three parts of acid to one hundred parts of water,) and left therein for about twelve hours, when they are removed and dried in the open air at a temperature of from 60 to 65 degrees for two or three days, and then the stones are ready for use.

The stones prepared according to my process are very hard and tough, and they are capable to resist the most severe influences of atmospheric changes.

Having thus described my invention, what I claim as new, and desire to secure by Letters Patent, is—

Artificial stone formed of the ingredients herein specified and treated repeatedly with sulphuric acid, substantially in the manner set forth.

This specification signed by me this 8th day of October, A. D. 1868.

CARL SCHAEFFER.

Witnesses:
 W. HAUFF,
 ERNEST F. KASTENHUBER.